(No Model.)
L. COLBURN.
GEARING.
No. 303,621. Patented Aug. 19, 1884.
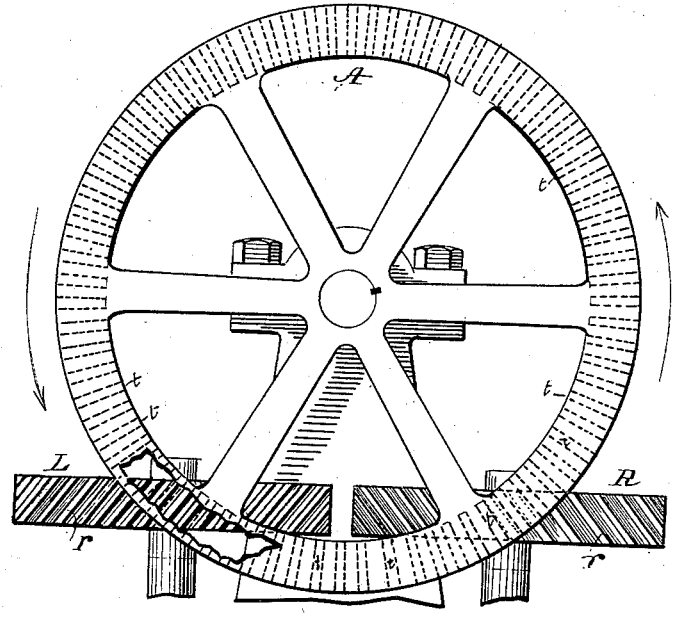
Fig.1.
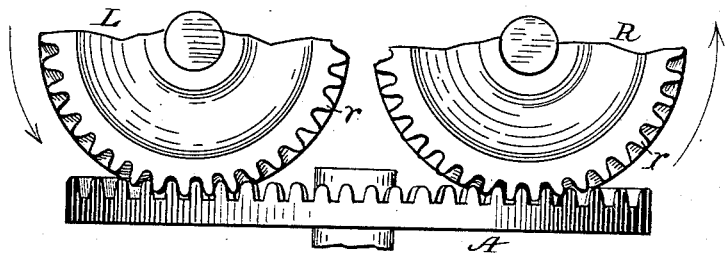
Fig.2.
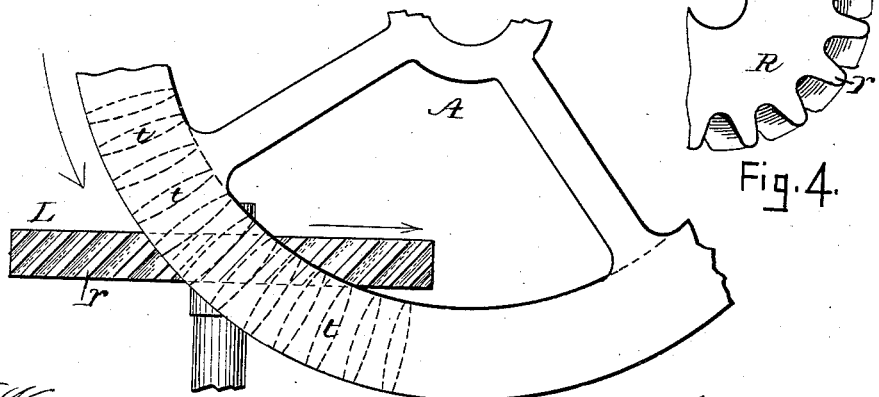
Fig.3.
Fig.4.
Witnesses
B. F. Sparrow
H. E. Remick
Inventor,
Ledyard Colburn

UNITED STATES PATENT OFFICE.

LEDYARD COLBURN, OF DERBY, CONNECTICUT.

GEARING.

SPECIFICATION forming part of Letters Patent No. 303,621, dated August 19, 1884.

Application filed June 16, 1883. (No model.)

*To all whom it may concern:*

Be it known that I, LEDYARD COLBURN, of Derby, New Haven county, in the State of Connecticut, have invented a new and useful Improvement in Gearing, of which the following is a specification.

My invention relates to the construction and arrangement of gear-wheels.

It consists in combining a radial-toothed crown or bevel gear wheel with an oblique or spiral toothed wheel in such manner that said radial-toothed wheel may mesh with and operate two or more oblique or spiral-cut wheels.

By means of my invention I am enabled to rotate in the same direction a pair of spiral-toothed wheels set in the same plane by placing the shafts on which they are mounted on opposite sides of the shaft of the radial-toothed wheel, which is at right angles with them, the teeth of said spiral wheels being right and left hand; but I do not confine myself to the use of a single pair of spiral wheels operated by the same radial-toothed wheels, as three or more oblique or spiral toothed wheels may be meshed into the same radial-toothed wheel, and all operated together. For example, two or more oblique or spiral gears may be operated by a radial-toothed wheel, said gears being right or left hand, by placing them in different planes on the same side of the shaft of the radial-toothed wheel; or a pair of right and left hand spiral gears may be placed on the same axial line on the same side of the axis of the radial-toothed wheel, by which last arrangement the oblique or spiral gears will revolve in opposite directions. In this combination of gear-wheels it will be seen that, first, there can be no contact of the axial lines of the spiral wheels with the axis of the radial-toothed wheel; second, that by varying the obliquity of the teeth of either spiral wheel its position on the radial-toothed wheel may be changed as may be desired; third, that the shafts on which said spiral wheels are mounted may be parallel, or that said shafts may be made to diverge from parallel lines to any desired angle by making the teeth on said spiral wheels more or less oblique; fourth, that if the shafts of the spiral wheels remain parallel and the obliquity of their spiral teeth is increased their axial lines will be further removed from the axis of the radial-toothed wheel.

The accompanying drawings illustrate my said invention.

Figure 1 shows a rear elevation of the radial-toothed crown-wheel A (partially broken away) as it meshes with the right and left hand oblique or spiral wheels R and L, the dotted lines indicating the position of the teeth $t\,t$ of the wheel A. The wheel A is so placed with reference to each of the wheels R and L that when their teeth mesh together in greatest contact the longitudinal center of the meshing tooth of one wheel coincides with the longitudinal center of the space it enters on the other wheel, and, to run smoothly, the teeth $t\,t$ of wheel A should be elliptical in form longitudinally, as shown in enlarged detail in Fig. 3; but I do not claim the elliptical-formed tooth on said wheel as my invention, as I am aware that a worm-gear having teeth made full in their central part and thinner at the sides, or elliptical in form, have been made heretofore. The teeth $r\,r$ of the wheels R L should be spiral cut, as shown in Fig. 4. Fig. 2 is a top plan view of my invention, and shows the manner in which the several wheels mesh together. Fig. 3 shows the elliptical form of teeth in wheel A. Fig. 4 is a detail view.

I claim—

1. The combination of a radial-toothed crown or bevel wheel with an oblique or spiral toothed wheel, as described, for the purpose set forth.

2. The combination of a radial-toothed crown or bevel wheel with a right and left hand oblique or spiral-cut wheel, as described and shown, for the purpose set forth.

In witness whereof I have signed this specification in the presence of two subscribing witnesses.

LEDYARD COLBURN.

Witnesses:
 B. F. SPARROW,
 H. E. REMICK.